United States Patent
Yamane

[11] Patent Number: 5,842,131
[45] Date of Patent: Nov. 24, 1998

[54] SYSTEM FOR CONFORMING POSITION OF MOVING TERMINAL

[75] Inventor: Kazuyasu Yamane, Hamura, Japan

[73] Assignee: Casio Computer Co., Ltd., Tokyo, Japan

[21] Appl. No.: 877,495

[22] Filed: Jun. 17, 1997

Related U.S. Application Data

[63] Continuation of Ser. No. 459,972, Jun. 2, 1995.

[30] Foreign Application Priority Data

Jun. 29, 1994 [JP] Japan .................................. 6-147435

[51] Int. Cl.$^6$ .............................. H04M 11/00; G01S 3/02
[52] U.S. Cl. .......................... 455/456; 342/452; 455/461
[58] Field of Search ................................... 455/461, 435, 455/426, 456; 342/452

[56] References Cited

U.S. PATENT DOCUMENTS

| | | | |
|---|---|---|---|
| 4,752,951 | 6/1988 | Konneker | 379/57 X |
| 4,843,622 | 6/1989 | Yotsutani et al. | 379/59 |
| 5,153,902 | 10/1992 | Buhl et al. | 379/57 |
| 5,222,123 | 6/1993 | Brown et al. | 455/435 X |
| 5,315,636 | 5/1994 | Patel | 455/461 |
| 5,365,516 | 11/1994 | Jandrell | 370/18 |
| 5,513,243 | 4/1996 | Kage | 379/58 |
| 5,515,426 | 5/1996 | Yacenda et al. | 455/73 |
| 5,590,398 | 12/1996 | Matthews | 455/426 X |
| 5,659,596 | 8/1997 | Dunn | 455/456 |

*Primary Examiner*—Curtis A. Kuntz
*Assistant Examiner*—Scott Richardson
*Attorney, Agent, or Firm*—Frishauf, Holtz, Goodman, Langer & Chick

[57] ABSTRACT

A system for confirming a position of a moving terminal in a radio communication network including a plurality of base stations each corresponding to one of a plurality of individual radio areas. A moving terminal having a specific identification number is provided which includes a receiver for receiving a paging signal including the specific identification number, and a transmitter for wirelessly outputting a response signal in response to the paging signal. A first data base is provided for storing position data representing positions within the plurality of individual radio areas to which a person holding the moving terminal may visit, and base station data representing respective ones of the base stations corresponding to the positions to which the person holding the moving terminal may visit. The position data and the base station data are stored in the first data base in an associated manner with respect to the identification number of the moving terminal. A position retrieving means is provided for identifying base station data corresponding to a given one of the base stations which receives the response signal output by the moving terminal, for retrieving from the first data base corresponding position data associated with the identified base station data, and for outputting the retrieved position data as a candidate for location of the person holding the moving terminal.

21 Claims, 8 Drawing Sheets

SYSTEM FOR CONFORMING POSITION OF MOVING TERMINAL

This application is a continuation of application Ser. No. 08/459,972, filed Jun. 2, 1995.

BACKGROUND OF THE INVENTION

1. Field of the Invention

The present invention relates to a system for confirming a position of a moving terminal having a radio communication function.

2. Description of the Related Art

Conventionally, in order to obtain position data of a person, there has been used a (Global Positioning System (GPS) which is a positioning system using a satellite for location management. A transmission terminal specified for each person is carried, updated position data of each terminal is prepared, and a location of a person is confirmed based on the position data. Such a location managing system is used, for example, to manage the allocation of vehicles in a taxi company, or other express businesses.

The position data, which are obtained by GPS, is coordinate values of a latitude/a longitude. Normally, a user of GPS uses a map display software corresponding to the position data, and confirms a location of a person by the position on the map informed by the map display software.

In recent years, in a portable telephone network, which has been developed and is known as a PHP (personal handy phone) system, a position of a transmitter/receiver is traced in cooperation with a plurality of base stations.

However, in the above-mentioned location managing system using GPS, there must be provided a large and expensive unit having a map display software for converting position data sent from a satellite to map data. Due to this, there has been a problem in that small companies and individuals have not been able to use the conventional location managing system.

Moreover, the PHP system has been used only as a portable telephone network, and other usage thereof has not been developed yet.

SUMMARY OF THE INVENTION

In consideration of the above-mentioned problems, an object of the present invention is to provide a system for confirming position data of a moving terminal, which can be obtained by a simple unit of a reasonable cost.

According to the present invention, there is provided a system for confirming a position of a moving terminal, comprising a radio communication network including a plurality of base stations, each base station being used for controlling an individual radio area; a moving terminal, having a specific identification number, for wirelessly outputting a response signal to a base station in response to a paging signal including the specific identification number; a first data base for storing location data relating to the moving terminal and base station data representing the base station for controlling the location to correspond to each other by each identification number; and position retrieving means for specifying the base station having the response signal of the moving terminal retrieving location data relating to the specified base station from the first data base, and outputting a result of retrieval as a candidate of a location where the moving terminal is positioned.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5($a$) is a flow chart explaining an operation of a paging terminal of the first embodiment of the present invention, FIG. 5($b$) is a flow chart explaining an operation of the service center, and FIG. 5($c$) is a flow chart explaining an operation of a paged moving terminal;

FIG. 8($a$) is a flow chart explaining an operation of a paging terminal of the second embodiment of the present invention, FIG. 8($b$) is a flow chart explaining an operation of the service center, and FIG. 8($c$) is a flow chart explaining an operation of a paged moving terminal.

DETAILED DESCRIPTION OF THE PREFERRED EMBODIMENTS

Structure of Entire System

Figure 1:
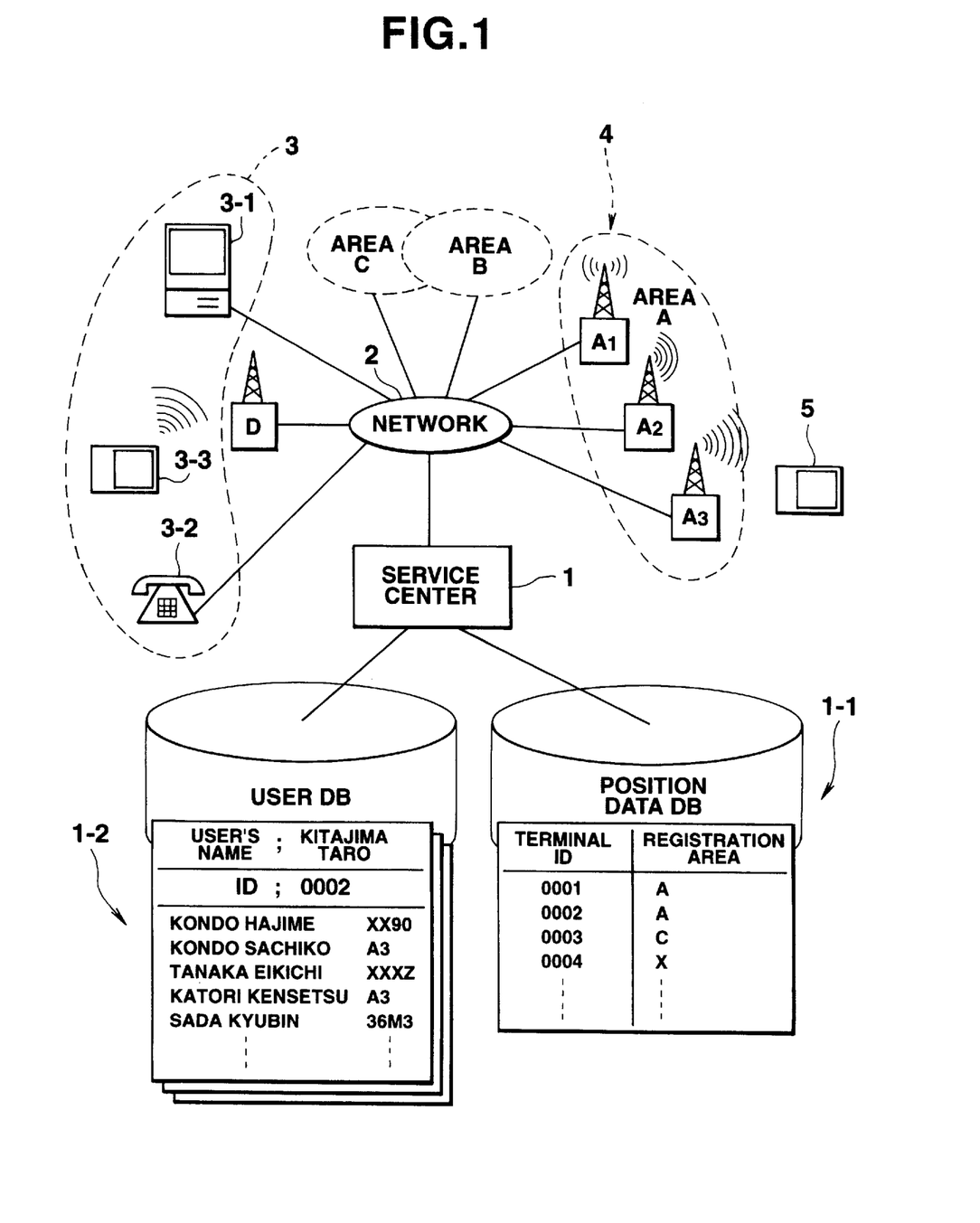
FIG. 1 is a block diagram showing a structure of a position data confirming system of a first embodiment of the present invention.

FIG. 1 is a block diagram showing a structure of a position data confirming system of a first embodiment of the present invention. A service center 1 is connected to a personal computer 3-1 or a telephone 3-2 through a wired network 2. Also, the service center 1 is wirelessly connected to a portable two-way radio communication device 3-3 through a radio base station D. Moreover, a radio communication network 4 is connected to the network 2.

In the radio communication network 4, a control area is divided to a plurality of sub-areas, and each sub-area has a plurality of radio base stations. For example, in an area A, radio base stations A1, A2, and A3 are provided. Such a radio communication network 4 is used in an automobile telephone system, a PHP system, and a paging system.

The service center 1 has a paging function for paging a moving terminal 5 by use of the radio communication network 4. Each of the radio base stations A1, A2 and A3 outputs a paging signal having a frequency peculiar to that station by use of a radio wave having fixed intensity.

The moving terminal 5 has an individual ID number, and outputs a response signal when receiving the paging signal in the terminal 5. Due to this, the moving terminal 5 comprises a circuit being automatically tuned with the frequency of the strongest radio wave, a circuit for discriminating the ID number, and a circuit for wirelessly responding by a specified frequency.

When the radio base station receives a response signal in response to its paging frequency, the radio base station transmits data specifying the moving terminal 5 responded to the paging, and base station data representing the same to the service center 1 through the network 2.

On the other hand, the service center 1 comprises a position data base 1-1 for storing data of the present position of the moving terminal 5, and a user data base 1-2 for storing data of a location or locations where a person having the moving terminal 5 should be present.

The position data base 1-1 is a data base having data of which area (one of any areas A, B, C, . . . in the figure) the moving terminal 5 is present and the ID number of the moving terminal 5. In this example, ID numbers "0001", "0002", "0003", "0004", . . . are registered, and names of areas, "A", "A", "C", "X", . . . , in the communication network 4 where the moving terminals of the ID numbers are present currently are registered to correspond to the ID numbers, respectively. The position data base 1-1 is searched to specify a communication area for transmitting the paging signal when paging is transmitted from the service center 1 to the moving terminal 5. Also, the position data base 1-1 is sometimes updated in response to the movement of the moving terminal 5. The updating operation is automatically carried out in the service center 1 in a case where there is an access to the service center 1 or to the other terminal 3 from the moving terminal 5 or a case where there is a response to the paging from the moving terminal 5. There is a case in which the paging to the moving terminal 5 is transmitted from the other terminal such as the personal computer 3-1. Or, there is a case in which the paging to the moving terminal 5 is periodically transmitted from the service center 1 to confirm the current position. Regarding which mode of these paging/response mode is used to update the present position, such a mode is selected by the moving terminal 5.

On the other hand, the user data base 1-2 is a data base of locations of the moving terminal 5 to be registered by a user's request. For example, names of customers to be visited by a salesman, who has the moving terminal 5, are registered in association with the sales person or in association with a sales area. More specifically, in this figure, there are registered "Kondo Hajime", "Sato Sachiko", "Tanaka Eikichi", "Katori Kensetsu", and "Sada Kyubin", which are the customers to be visited for which a salesman "Kitajima Taro", which has the moving terminal 5 of the ID number "0002", is responsible. Then, names of base stations "XX90", "A3", "XXXZ", "A3", and "36M3", which the cover locations of the customers, are registered to correspond to the names of the customers, respectively. When a transmitting/receiving terminal (hereinafter called user's terminal) 3 requests a confirmation of the position of the moving terminal 5 by designating its ID number, the user data base 1-2 is retrieved based on the response of the moving terminal 5 obtained in response to the paging from the service center 1. The obtained one or a plurality of names of locations or customers are transmitted to the user's terminal 3.

As the above-mentioned network 2, there is used a public communication network such as a telephone line or an integrated services digital network (ISDN). It is of course that the above-mentioned connection may be made through a specific area communication network such as a LAN (local area network). Moreover, it is possible to structure the position data transmitting system shown in the figure by only LAN. Further, there can be structured a network wherein a host station, which is formed of assembly of a computer, an exchanger, and a digital server for temporarily storing a digital signal, is provided, the respective relay centers are connected from the host station through an optical fiber network, and the network is connected from these relay stations to a terminal at home through a coaxial cable or to the moving terminal wirelessly.

Among the receiving/transmitting terminals 3, a personal computer 3-1 is a general personal computer, which is connected to the network 2 through a communication interface. Then, the personal computer 3-1 executes a two-way communication between the computer 3-1 and the service center 1 by use of a communication protocol. A telephone 3-2 is a general push button type telephone, which is connected to the network 2 through the telephone network, to execute a communication. A portable two-way radio communication device 3-3 is, for example, a two-way radio communication device. This kind of paging device receives message data following a selection calling number to display the message data on one hand, and inputs a desired party selection calling number and message data to the party to be transmitted on the other hand. Moreover, this type of paging communication device is structured such that information of 20 characters can be normally received and transmitted by 4-bit paging communication device and that information of 40 characters can be normally received and transmitted by 8-bit radio communication device. The outline of the radio communication device 3-3 shown in the figure is shaped like a POD (programmable operation display). On the front surface of the device, there is provided a liquid crystal display device of a dot-matrix type to display various kinds of data. Moreover, a pen inputting device, which comprises a pressure sensitive or electromagnetic induction tablet to be superimposed on the entire surface of the liquid crystal display device, is incorporated thereto.

Structure of Radio Communication Device

Figure 2:
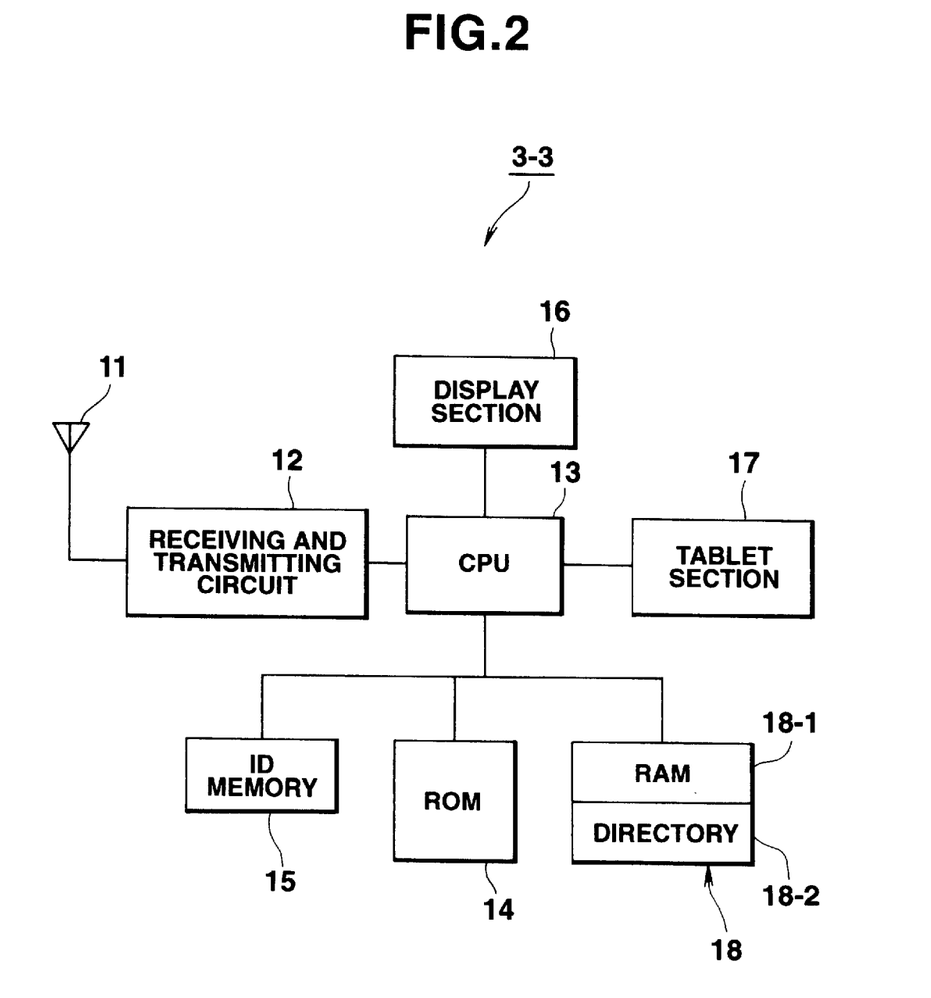
FIG. 2 is a block diagram showing an internal circuit structure of a radio communication device of the first embodiment of the present invention.

FIG. 2 is a block diagram showing an internal structure of the radio communication device 3-3. In the figure, an antenna 11 is used to receive a radio signal transmitted from the base station and transmit a radio signal to the base station.

A receiving/transmitting section 12 comprises a circuit for outputting serial digital data having "0" and "1", which is obtained by detecting, amplifying and demodulating a receiving signal inputted from the antenna 11 at the time of receiving, to a CPU (Central Processing Unit) 13. Moreover, the receiving/transmitting section 12 comprises a circuit by which serial digital data inputted from the CPU 13 is modulated to be converted to a spectrum matching with a frequency band of the radio signal of the section 12, which is being synchronized with the radio signal transmitted from the base station, and a pass band signal generated by the modulation is wirelessly transmitted through the antenna 1.

The CPU 13 is a circuit for sequentially reading a system program stored in a ROM (Read Only Memory) 14, which is a fixed memory, and controlling each section to execute the processing. Moreover, the CPU 13 obtains an input synchronization of receiving data outputted from the receiving/transmitting section 12 and corrects an error. Then, in the CPU 13, it is checked whether or not a paging number, which is shown by address bits of receiving data conforms to a specific address number, which is stored as an assigned paging number in an ID memory 14, which is a fixed memory. If the paging number conforms to the address number, the process is advanced to a receiving process, and message data received continuous to the paging number is converted to parallel data to execute a display processing. On the other hand, if the paging number does not conform to the address number, instruction of the stop of reception is provided to the receiving/transmitting section 12.

The CPU 13 is connected to a display section 16, a tablet section 17, and a RAM (Random-Access-Memory) 18.

The display section 16 comprises the liquid crystal display device explained in FIG. 1. Further, the display section 16 comprises a character generator for generating dot pattern data, and various display data, a display buffer for temporarily storing display data generated by the character generator, and a display driver for displaying data stored in the display buffer on the liquid crystal display device. Then, the receiving message or pen input data is displayed on the liquid display device under control of the CPU 13.

The tablet section 17 comprises the pen input device explained in FIG. 1. The tablet 17 detects an input position of the pen, and outputs coordinate data to the CPU 13. The CPU 13 executes various processings based on a pen input signal sent from the tablet section 17. Whereby, the radio communication device 3-3 can input transmitting data by the pen input from the tablet section 17. In addition, the radio communication device 3-3 can be used as a personal digital assistant in a form of the pen inputting or a computer when the communication is not performed.

The RAM 18 is a readable and writable memory. The RAM 18 comprises a RAM area 18-1, which is normally used as a work area, and a directory area 18-2 forming a data base having address and telephone number every person's name. The RAM area 18-1 stores various data outputted from the CPU 13 in accordance with the instruction of CPU 13. The directory area 18-2 outputs address and telephone number, which correspond to the received person's name, to the CPU 13.

Structure of the Service Center

Figure 4:
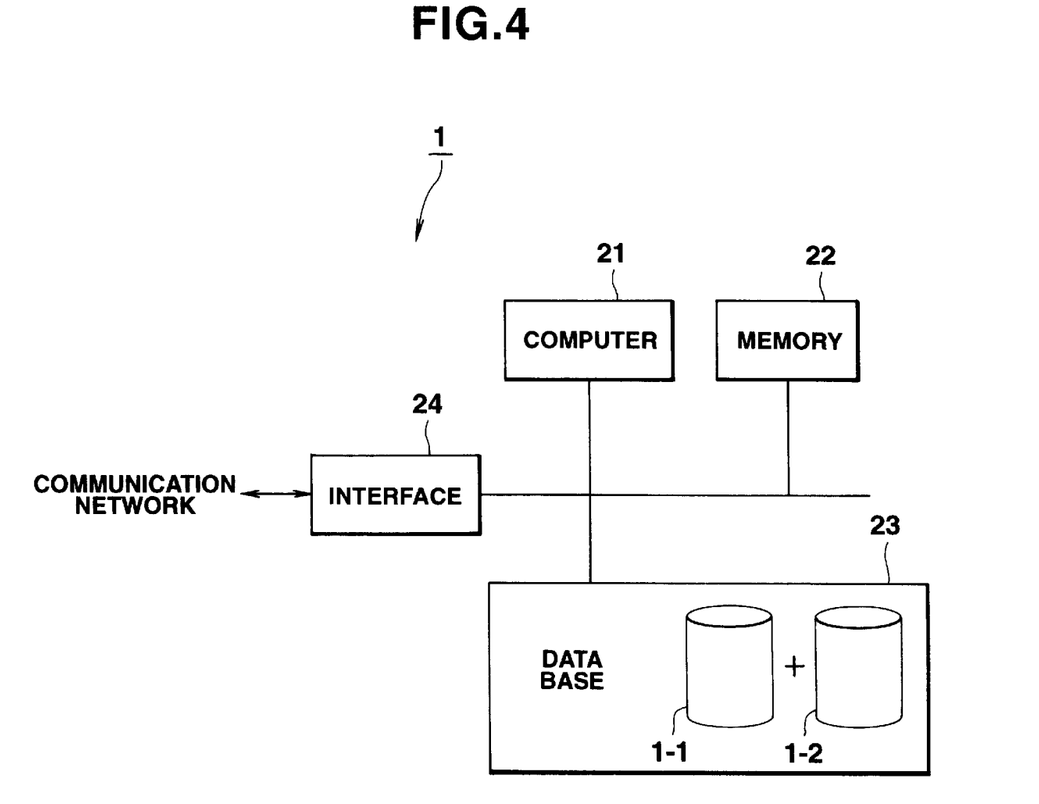
FIG. 4 is a block diagram showing a structure of a service center of the first embodiment of the present invention.

FIG. 4 is a block diagram showing the structure of the above-mentioned service center 1. As shown in the figure, the service center 1 comprises a computer 21, a memory 22, and a data base 23. The service center 1 is connected to the network 2 of FIG. 1 through an interface 24.

The computer 21 is a computer having a suitable function corresponding to the contents of the service including a position confirming service and its amount. The computer 21 controls each section shown in FIG. 4 by the program stored in ROM (not shown) to execute a service processing of a positional retrieval to be described later.

The memory 22 is a memory, which temporarily stores a number of paged terminal designated by a calling subscriber, paged terminal response data transmitted from the base radio station, and data to be transmitted to the user's terminal from the service center.

The data base 23 is a memory device, which stores the position data base 1-2 and the user data base 1-2 of FIG. 1, and a personal file (not shown ) having an individual name and an ID number of of the moving terminal 5 which the individual carries.

The interface 24 is a user network interface corresponding to a case that the network 2 is a telex network or a case that the network 2 is a packet exchange network or a DDX (Digital-Data-Exchange) line exchange. Only a communication signal to the associated service center 1 is fetched from a communication signal of such as a telephone, an on-line communication, which are transmitted through the network 2. The fetched communication signal is passed to the service center 1. Also, a communication signal outputted from the service center 1 is transmitted to the network 2.

Operation of System

An operation of the above-structured position data confirming system will be explained with reference to the flow charts of FIGS. 5(*a*), 5(*b*), and 5(*c*). In this process, the portable radio communication device 3-3 is used as the user terminal 3 requesting a position retrieval service to the service center 1 (hereinafter, the terminal of the request side is called a paging terminal 3).

First of all, the portable radio communication device 3-3, which is the paging terminal, requests a position retrieval service (step S1). In this case, a person's name whose location should be retrieved is "Kitajima Taro."

Figure 3A:
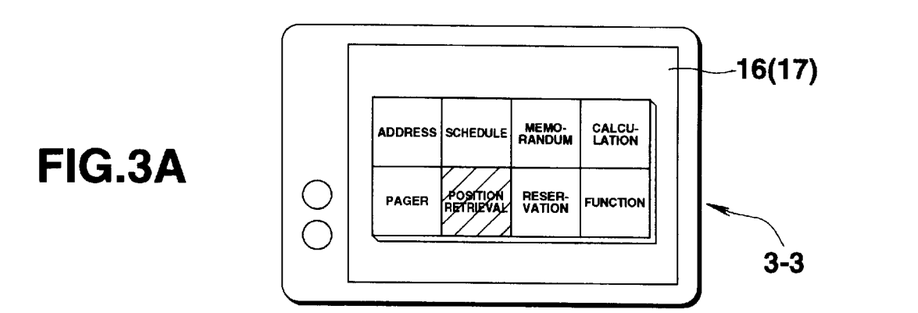
FIGS. 3A to 3D are views each showing a display state of a liquid crystal display device of the radio communication device.

If a power switch (not shown) of the paging terminal 3-3 is turned on to receive the position data service, a menu of the liquid crystal display 16 is shown (FIG. 3A). In this example, eight small display frames or items are set. In other words, eight processing names, that is, an address, a schedule, a memorandum, a calculation, a pager, position retrieval, a reservation, and a function are displayed. The "address" is a processing to prepare, register and display a directory of customers, for example. The "schedule" is a processing to enter, register and display a schedule of an action. The "memorandum" is a processing to enter, register and display a written reminder. The "calculation" is used as a calculator, and the "pager" is used as a transmitter/receiver. The "position retrieval" is a position confirming processing of the moving terminal 5 based on the present invention. The "reservation" is a processing to enter, register and display the contents of the various reservations. The "function" is a processing to display a processing menu such as a setting of a personal dictionary, a setting of an environment, a correction of registered data, erasing of data.

Figure 3B:
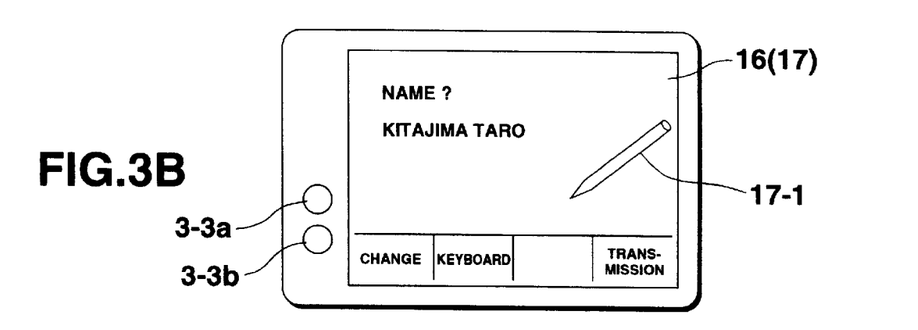

In this case, if an item of "position retrieval" is selected by the clicking of a pen input device 17-1 in a tablet section 17, the processing for "position retrieval" is executed, and a guide display of "Name?" is displayed on an upper portion of the display 16 (FIG. 3B). The user sequentially writes "Kitajima Taro" on the screen of the display 16 by use of the pen 17-1 in accordance with the guide. Thereafter, when the user touches at a "transmission key", a request of position retrieval of a person, "Kitajima Taro" is transmitted to the service center 1 (step S1).

It is noted that a "change" is selected only in a case where the entered character is erased or changed, and that "keyboard" is touched in a case where the keyboard is displayed on the screen of the display 16 to perform a key input.

Upon reception of the transmission signal, the service center 1 retrieves an individual file and reads out a corresponding ID code (step C1). Whereby, the ID code "0002" corresponding to "Kitajima Taro" is read from the individual file.

Sequentially, the center 1 searches the position data base 1-1 in a state that the read ID code is used as a key (step C2). If Mr. Kitajima is in the area of the base station A3, a communication area "A" stored in the data base 1-1 as position data corresponding to the ID code "0002", is read out.

Then, the center 1 performs a non-signaling paging based on the communication area "A", which is the above-detected position data (Step C3). In this processing, the moving terminal 5 is requested to be paged via the communication area A. Whereby, the radio base stations A1, A2 and A3, which are in charge of the divided areas of the communication area A of the radio communication network 4, are rendered to perform the non-signaling paging to the terminal 5.

The power switch of the paged terminal 5 is always turned on, and the CPU of the terminal 5 is in a standby state (HALT) to check whether or not there is a paging to the terminal 5 ("No" in step T1). If a paging signal having a frequency of the strongest radio wave is received (Yes in step T1), it is checked whether or not the received paging signal is a non-signal paging by checking, for example, whether a predetermined bit of the received paging signal is "1" or "0" (step T2). If the received paging signal is a non-signal paging (Yes in step T2), only a response is transmitted without providing information to the carrier who has the terminal 5 by a sound or a display (Step T3). An ID number of the paged terminal 5, for example, "0002" is provided to the code denoting the response, and a response signal, which is obtained by modulating a carrier wave with a signal specifying the radio base station A3, which is located nearest to the the paged terminal 5, is transmitted from the paged terminal 5. Thus, a response signal, which has a code "A3" provided to the ID number "0002" of the paged terminal 5, is transmitted from the radio communication network 4 where the transmitted signal is received to the center 1 through the network 2.

In the step T2, if the received paging signal is a signaling paging, the paging signal is not transmitted through the center 1, but a normal paging signal. In this case, the paging processing to the carrier of the terminal 5 is performed by the sound or the display (step T4).

The center 1 checks the presence of a response (response signal from the radio communication network 4) from the paged terminal 5 in a standby state for a fixe period of time after paging by the above-mentioned non-signaling paging (step C4). If the response (response signal from the radio communication network 4) is received from the paged terminal 5 (Yes in step C4), a radio base station is specified based on the response signal (step C5). Whereby, in this case, radio base station "A3" is specified.

Sequentially, the center 1 retrieves the user data base 1-2 (FIG. 1), which is the corresponding file, on the basis of the ID number of the paged terminal 5 and the above-specified radio base station used as a key. Then, names of customers, who are present in the communication area of the radio base station "A3" of the carrier of the paged terminal 5, are retrieved (step C6). Whereby, it is detected that "Kitajima Taro", who carries the paged terminal 5 having ID number "0002", and who are present in the communication area of the radio base station "A3", has the customers on business, for example, "Sato Sachiko" and "Katori Kensetsu."

Sequentially, the center 1 transmits the above result to the paging terminal 3 through the network 2. On the other hand, in step C4, if no response is transmitted from the paged terminal 5 even if a fixed period of time is passed, a result signal showing no response is transmitted to the paging terminal 3 (step C7).

If the paging terminal 3 receives the signal from the center 1 (step S2), it is checked whether or not data (names of customers) is included in the received signal (step S3). If data is included in the received signal (Yes in step S3), data (name of customers) is used as a key to retrieve a directory 18-2, so that addresses and telephone numbers of the customers are detected (step S4).

Figure 3C:
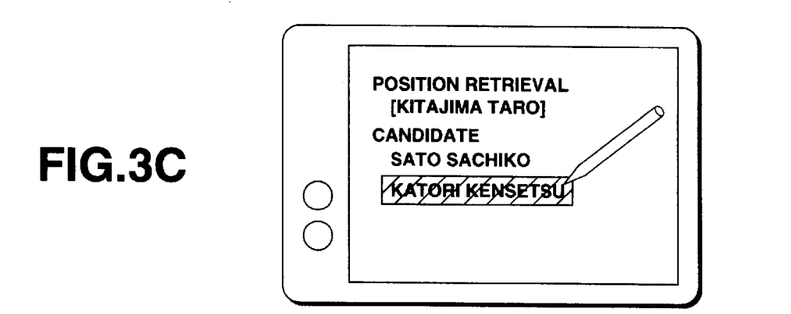

Then, the paging terminal 3-3 displays the names of customers to be visited. In FIG. 3C, a plurality of customers, who Kitajima Taro may visit, "Sato Sachiko" and "Katori kensetsu" are displayed as a result of "retrieval of location" of "Kitajima Taro." If "Katori kensetsu" is selected by the user, the terminal 3-3 retrieves the corresponding telephone number and address of the selected customer with reference to the directory 18-2 provided inside.

Figure 3D:
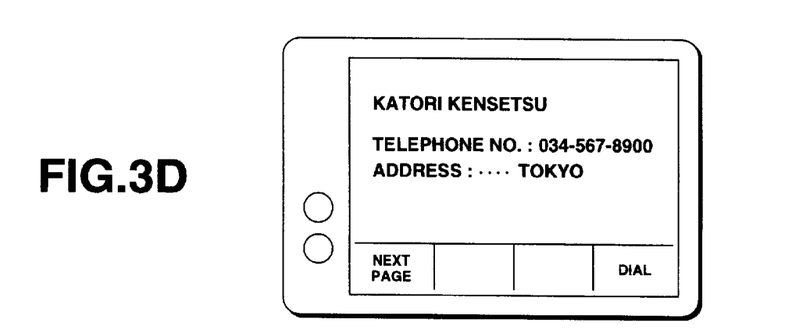

Then, "Katori kensetsu" and its telephone number "034-567-8900" and its address "Address . . . Tokyo" are displayed (FIG. 3D). In this case, item in FIG. 3D "Dial" is selected, a dial tone of the telephone number "034-567-8900" is outputted.

On the other hand, in step S3, if there is no data, this shows a case in which no customer or no response to the paging exists in the corresponding communication area. In this case, for example, the result, "No customer" or "No response" is displayed (step S5).

The above embodiment explained the case in which there is used a bi-directional radio communication device 3-3, which is a communication terminal having a display device as a calling subscriber's terminal. However, a telephone 3-2 for calling out can be used and an audio response unit can be further provided to the structure of the service center 1 of FIG. 1. Whereby, the audio response unit is functioned as a man-machine interface between the calling subscriber and the computer 21 of the service center 1. In this case, the audio response unit recognizes a person's voice or an operational sound of a push button inputted from the telephone 3-2 through the network 2 and the interface 24, converts these analog input to a digital command code, and provides the converted command code to the computer 21. Moreover, the response to the command code from the computer 21 is converted to a composite sound corresponding to the response code, and a response to the calling subscriber is performed by the composite sound through the interface 24 and the network 2. In this case, the computer 21 changes a protocol for the voice recognition to that for a code recognition when the communication from the calling subscriber is performed by the personal computer, and the communication between the calling subscriber and the computer can be directly performed without using the audio response unit.

The system using the telephone 3-2 can be used in the following manner.

More specifically, in an amusement park or an exhibition grounds, a card and a terminal to be paged, which have the same ID number as each other, are lent to a child and his parent, who will enter, with charge or without charge. If the child is lost, the parent informs the ID number of the card from the nearest telephone booth, and can obtain position data of the child from the host station immediately. Of course, in this case, a pager, which the parent owns, may be used to call out, or a portable telephone set may be used.

Second Embodiment

In the above embodiment, the user data base 1-2 is provided in the center 1. In a case where the paging terminal 3 may have a memory having a sufficient capacity, the user data base 1-2 can be provided in the paging terminal 3 in place of the center 1, so that customers' list can be prevented from being known by others and confidentiality of the company can be fully kept. The following will explain an example of such a case as a second embodiment of the present invention.

The structure of the position data transmission system of this embodiment is almost the same as the previous embodiment of FIG. 1. However, in the second embodiment, a portable radio communication device 3-3' of FIG. 6 and a center 1' of FIG. 7 are used in place of the portable radio communication device 3-3 of the previous embodiment and the center 1, and their structure is partially different from the structure of the previous embodiment.

Figure 6:
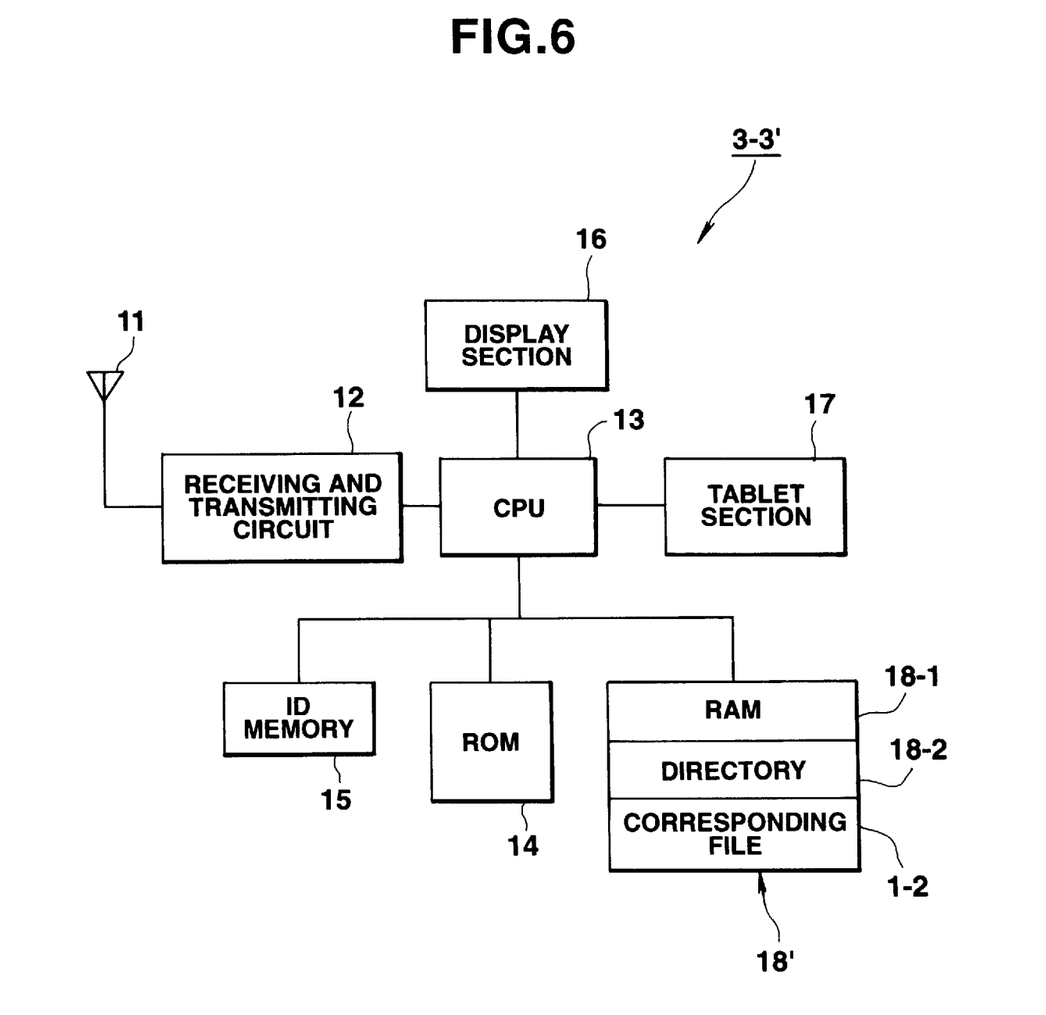
FIG. 6 is a block diagram showing an internal circuit structure of a radio communication device of a second embodiment of the present invention.

FIG. 6 is a block diagram of an internal circuit of the portable radio communication device 3-3'. As shown in the figure, a RAM area 18-1, a directory area 18-2, and a corresponding file 1-2 (user data base 1-2 shown in FIGS. 1 and 4) are added to the area structure of a RAM 18'. The structure of the other sections is the same as that of the sections of FIG. 2.

Figure 7:
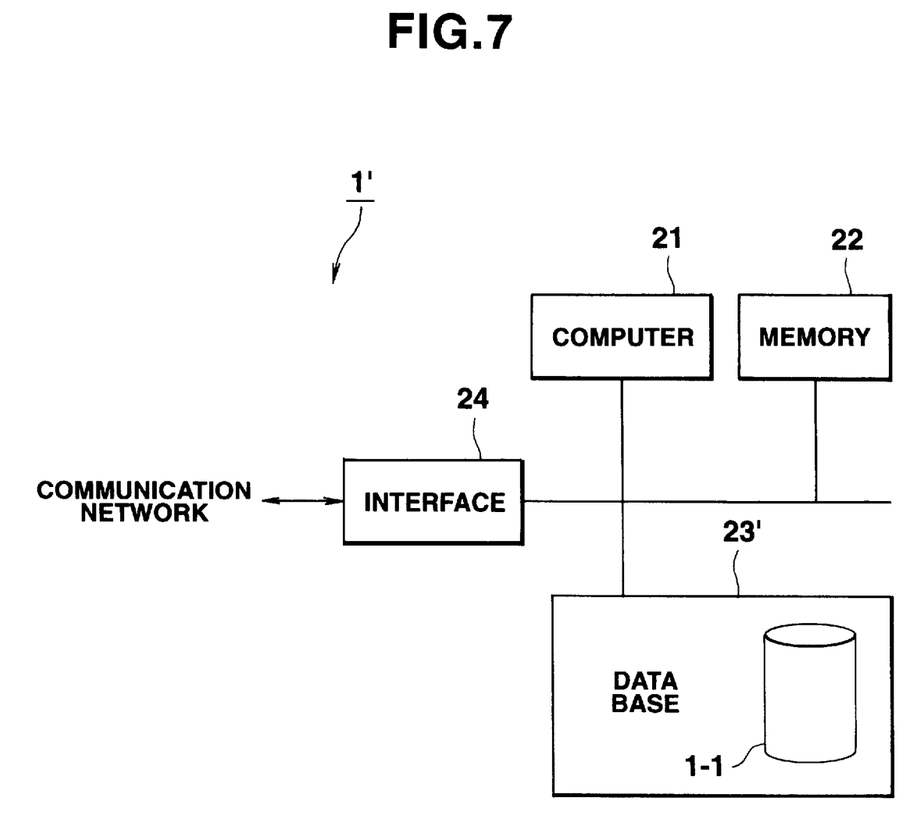
FIG. 7 is a block diagram showing a structure of a service center of the second embodiment of the present invention.

FIG. 7 is a block diagram showing the structure of the center 1'. As shown in the figure, a data base 23' is structured such that the user data base 1-2 is removed from the data base 23 of FIG. 4 and only the position data 1-1 is provided. The structure of the other sections is the same as that of the sections of FIG. 4.

Figure 8A:
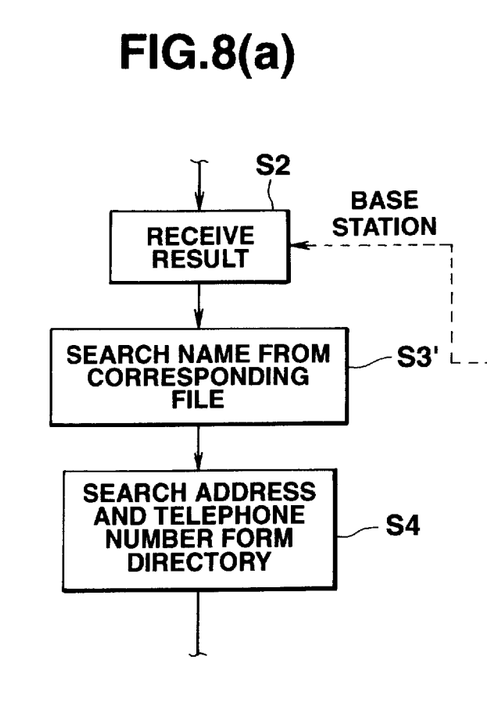
Figure 8B:
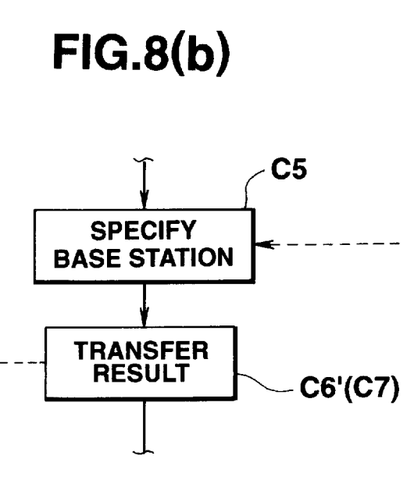
Figure 8C:
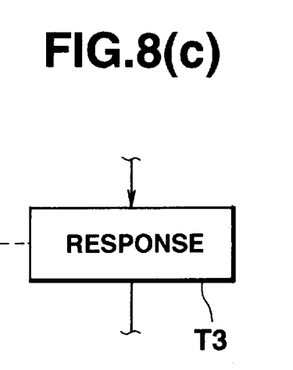

The following will explain an operation of the above-structured position data transmission system with reference to the flow charts of FIGS. 8(a) to 8(c). FIGS. 8(a) to 8(c) show only the steps relating to the different portions from the operation shown by the flow charts of FIGS. 5(a) to 5(c). The other steps are omitted since they are the same as the steps of FIGS. 5(a) to 5(c).

If the paging terminal 3 requests a position retrieval service, the paged terminal 5 of FIG. 1 makes a response at a step T3 by the same operation as the first embodiment (FIG. 8(c)). The center 1' specifies the radio base station based on the response signal similar to the case of FIG. 5(b) (Step C5). Then, the specified radio base station, for example, "A3" is transferred to the paging terminal 3 through the network 2 (step C6'). The transfer processing is substantially the same as step C7 of FIG. 5(b). However, the content of the signal to be transmitted is different from the case of step C7. In other words, there is no data of the names of customers in the communication area "A3", and only the name of the base station is transmitted.

Then, if the paging terminal 3 receives the transferred response (step S2), the paging terminal 3 accesses the corresponding file 1-2 (user data base 1-2) by using, as a key, a name of a person responded and the name of the radio base station included in the response signal or using an ID number of the paged terminal 5 (step S3'). Whereby, locations where "Kitajima Taro", who carries the paged terminal 5 of ID number "0002" corresponding to the radio base station "A3", is expected to be present, that is, names of customers "Sato Sachiko" and "Katori kensetsu" are detected.

Figure 5A:
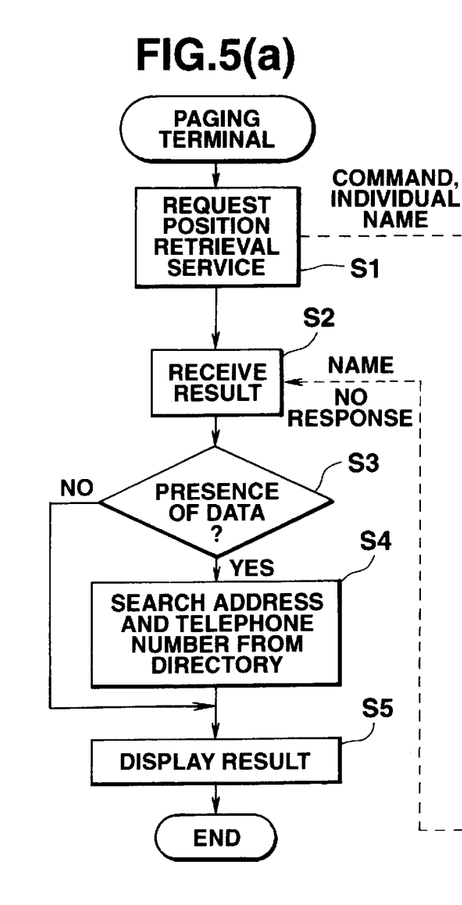
Figures 5B, 5C:
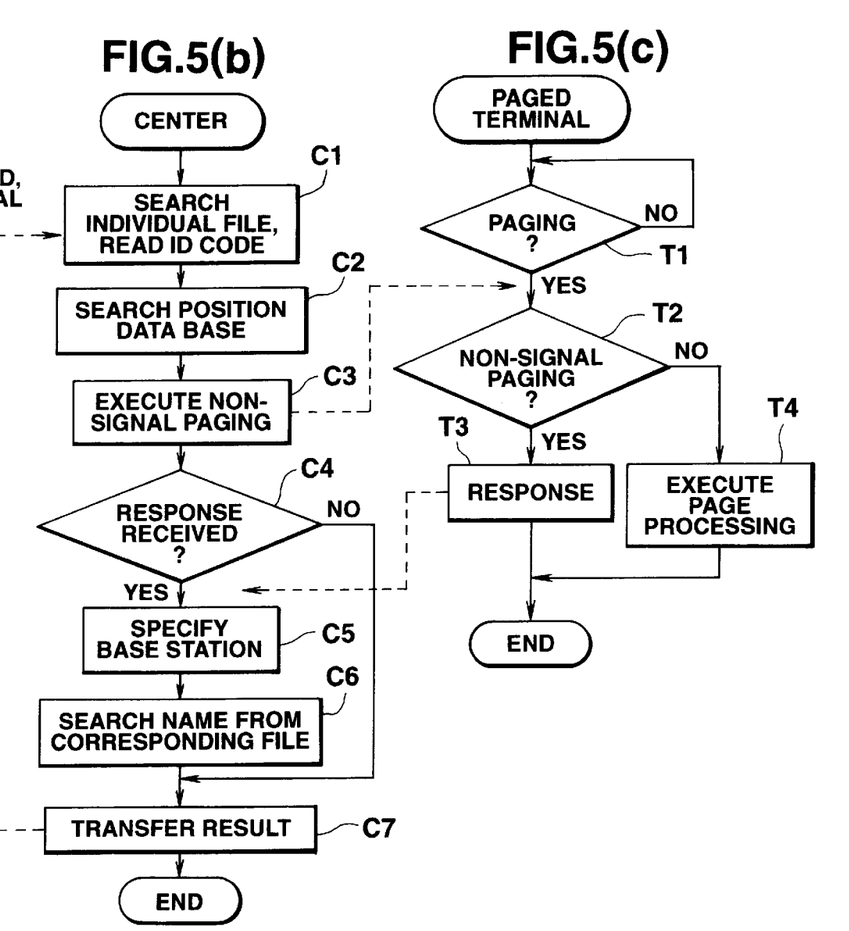

Sequentially, the paging terminal 3 checks the directory 18-2 using the names of customers as a key, and the address and telephone number of the customer are detected (step S4), and the display processing of step S5 of FIG. 5(a) is performed.

As mentioned above, in the second embodiment, only the position of the paged terminal 5 or a name of the radio base station may be detected from the response to the service center. Due to this, even if the service center and the radio communication network are established for the other object, it can be considered that they can be used if the service center and the radio communication network have a function of tracking the position of the paged terminal.

In the above two embodiments, the paged terminal 5 is paged from the radio communication network 4 in accordance with the paging from the paging terminal 3. However, the present invention is not limited to the above embodiments. A registered area, which is obtained by retrieving the position data 1-1 in accordance with the paging from the paging terminal 3, may be directly returned to the paging terminal 3, whereby processing time can be reduced, and an economic aspect can be improved.

As explained above, according to the present invention, by use of a paged terminal tracking function of a radio communication network and position registration data of a service center, the location of the paged terminal is estimated in the service center or the two-way radio terminal, so that a simple device with low cost may be used even if no function such as GPS is provided. Therefore, such a device can be easily used in the small-sized companies or individuals. Also, the simple service center and a plurality of radio base stations are provided in the specific area so that a limited area position data transmission system can be formed. Moreover, the present invention can be applied to various usage by changing the structure of the user data base.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A system for confirming a position of a moving terminal comprising:

a radio communication network including a plurality of base stations, each of said base stations corresponding to one of a plurality of individual radio areas;

a moving terminal having a specific identification code, said moving terminal including a receiver for receiving a paging signal including said specific identification code, and a transmitter for wirelessly outputting a response signal in response to said paging signal;

a first data base for previously storing position data representing positions within said plurality of individual radio areas to which a person holding said moving terminal may visit, and base station data representing respective ones of said base stations corresponding to said positions to which the person holding said moving terminal may visit, said position data and said base station data being stored in an associated manner with respect to said identification number of said moving terminal; and a service center means for paging one of said moving terminals by use of said radio communication network and for identifying base station data corresponding to a given one of said base stations which receives said response signal output by said moving terminal; and position retrieving means for retrieving from said first data base corresponding position data associated with said identified base station data, and for outputting said retrieved position data as a candidate for location of the person holding said moving terminal.

2. The system according to claim 1, wherein said location data comprises names of companies and individuals which the person holding said moving terminal may visit.

3. The system according to claim 2, wherein said system includes a plurality of moving terminals, and said system further comprises:

a request device for requesting retrieval of a position of one of said moving terminals.

4. The system according to claim 3, wherein:
said first data base and said position retrieving means are provided in said service center means and operate together to determine a candidate for location of the person holding the requested one of said moving terminals; and
said service center means includes a transmitter for transmitting to said request device the candidate for location of the person holding the requested one of said moving terminals.

5. The system according to claim 4, wherein said request device comprises:
a second data base for storing telephone number data and address data; and
retrieving means for retrieving a telephone number and an address from said second data base corresponding to the candidate for location received from said service center means.

6. The system according to claim 3, wherein:
said service center means includes a transmitter for transmitting to said request device a signal identifying the given one of said base stations which receives said response signal output from the requested one of said moving terminals; and
said first data base and said position retrieving means are provided in said request device and operate together to determine a candidate for location of the person holding the requested one of said moving terminals.

7. The system according to claim 6, wherein said request device comprises:
a second data base for storing telephone number data and address data; and
retrieving means for retrieving a telephone number and an address from said second data base corresponding to the determined candidate for location of the person holding the requested one of said moving terminals.

8. The system according to claim 3, wherein said service center means comprises means for executing a non-signaling paging of a specific moving terminal according to a requested position retrieval service.

9. A device for retrieving a position of a moving terminal in a wireless network paging system having a plurality of radio base stations each corresponding to one of a plurality of individual radio areas, said device comprising:
a data base for previously storing position data identifying positions to which a person holding said moving terminal may visit and base station data identifying ones of said radio base stations corresponding to said positions to which the person holding said moving terminal may visit;
retrieving means for retrieving from said data base corresponding position data associated with a base station data, wherein the base station data corresponds to a given one of said base stations which receives a paging response signal from said moving terminal; and
outputting means for outputting said retrieved Position data as a candidate for location of the person holding said moving terminal;
wherein said paging system comprises a terminal device for outputting a request for paging, and service center means for paging said moving terminal in response to the request; and
wherein said data base, said retrieving means, and said outputting means are provided in said terminal device.

10. The device according to claim 9, wherein said position data stored in said data base comprises names of companies, individuals, and locations which the person holding said moving terminal may visit.

11. A method for confirming a position of a person holding a moving terminal in a wireless communication network including a plurality of radio base stations each corresponding to one of a plurality of individual areas, said method comprising the steps of:
a) preparing a first data base for storing position data identifying positions to which a person holding said moving terminal may visit and base station data identifying ones of said radio base stations corresponding to said positions to which the person holding said moving terminal may visit;
b) paging said moving terminal and identifying a given one of said radio base stations which receives a response signal from said moving terminal;
c) retrieving from said first data base position data associated with base station data corresponding to the identified given one of said base stations which receives the response signal from said moving terminal;
d) outputting said retrieved position data as a candidate for location of the person holding said moving terminal;
(e) providing a second data base for storing telephone number and address data of companies and individuals; and
(f) retrieving a telephone number and an address from said second data base corresponding to said position data retrieved in said step (c);
wherein said position data stored in said first data base in said step (a) comprises names of companies and individuals which the person holding said moving terminal may visit.

12.. The method according to claim 11, further comprising the step of requesting retrieval of a position of said moving terminal by means of a request device, and wherein the steps (b), (c), and (d) are executed by a service center means.

13. The method according to claim 11, further comprising the step of requesting retrieval of a position of said moving terminal by means of a request device, and wherein the steps (b), (c), and (d) are executed by said request device.

14. A system for confirming a position of a moving terminal, comprising:
a radio communication network including a plurality of base stations, each of said base stations corresponding to one of a plurality of individual radio areas;
a terminal, having a specific identification code and movable within said individual radio areas, for wirelessly outputting a response signal to a given one of said base stations corresponding to a given one of said individual radio areas in which said terminal is positioned in response to a predetermined signal from the given one of said base stations;
a first data base for storing position data representing positions within said plurality of individual radio areas to which a person holding said terminal may visit, and base station data representing respective ones of said base stations corresponding to said positions to which the person holding said terminal may visit, said position data and said base station data being stored in an associated manner with respect to said specific identification code of said terminal; and
position retrieving means for identifying base station data corresponding to the given one of said base stations which receives said response signal output by said terminal, retrieving from said first data base corresponding position data, and outputting said retrieved position data as a candidate for location of the person holding said terminal.

15. The system according to claim 14, wherein said position data comprises names of companies and individuals which the person holding said terminal may visit.

16. The system according to claim 15, further comprising:

a request device for requesting a retrieval of a position of said terminal, and a service center for paging a specific terminal;

wherein said radio communication network serves as a paging system for said service center.

17. The system according to claim 16, wherein said first data base and said position retrieving means are provided in the service center, and the service center transmits a retrieval result of said position retrieving means to the request device.

18. The system according to claim 17, wherein said request device comprises a second data base for storing data of telephone numbers and addresses of companies and individuals, and location retrieving means for retrieving a telephone number and an address of a location where the person having said terminal may visit based on the retrieval result transmitted by the service center.

19. The system according to claim 16, wherein said first data base and position retrieving means are provided in said request device, said service center includes means for transmitting data of a base station responding to a paging of the terminal to the request device, and said request device includes means for obtaining a candidate of the location of the terminal based on response base station data received from said service center.

20. The system according to claim 17, wherein said request device further comprises a second data base for storing data of telephone numbers and addresses of companies and individuals, and location retrieving means for retrieving a telephone number and an address of a location where the person having said terminal may visit based on the retrieval result of said position retrieving means.

21. The system according to claim 16, wherein said service center comprises means for executing a non-signaling paging of specific terminal according to a requested position retrieval service.

* * * * *